Dec. 22, 1953  W. D. HERSHBERGER  2,663,798
METHOD AND SYSTEM FOR STABILIZING
THE FREQUENCY OF OSCILLATORS
Filed Dec. 31, 1948  3 Sheets-Sheet 1

INVENTOR
*William D. Hershberger*
BY
*J. L. Whittaker*
ATTORNEY

Dec. 22, 1953  W. D. HERSHBERGER  2,663,798
METHOD AND SYSTEM FOR STABILIZING
THE FREQUENCY OF OSCILLATORS
Filed Dec. 31, 1948  3 Sheets-Sheet 2
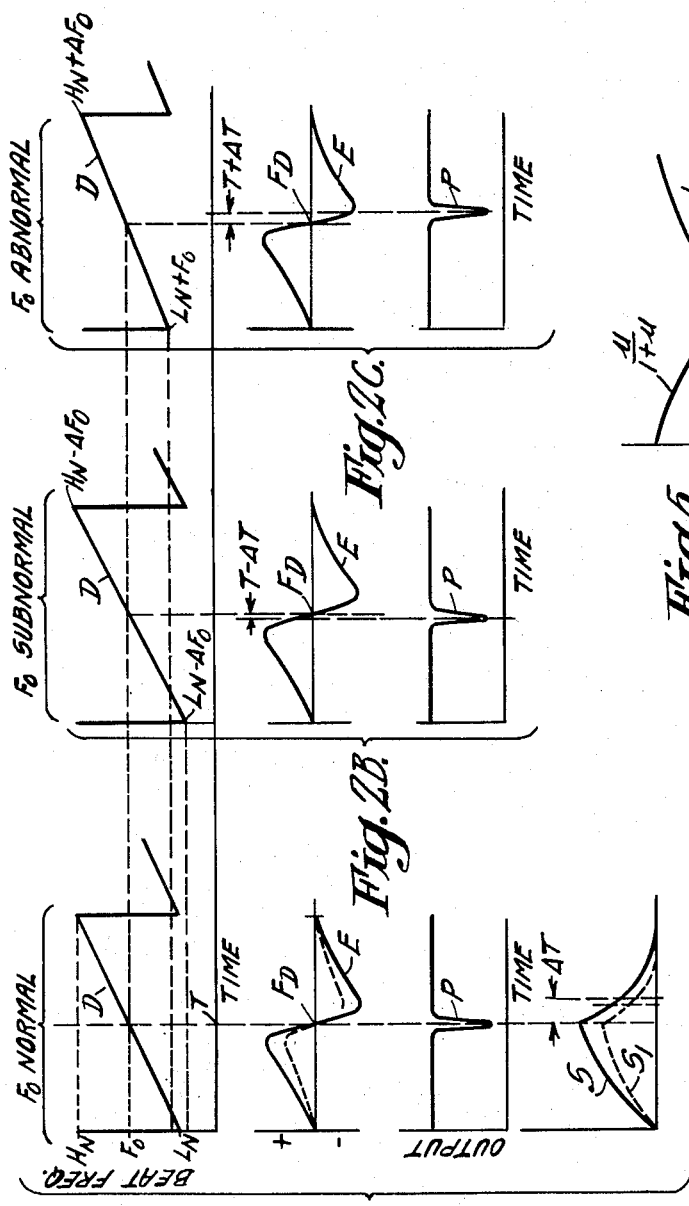
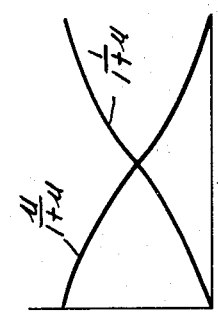
Fig. 5.
Fig. 2A.  Fig. 2B.  Fig. 2C.
INVENTOR
William D. Hershberger
BY
ATTORNEY

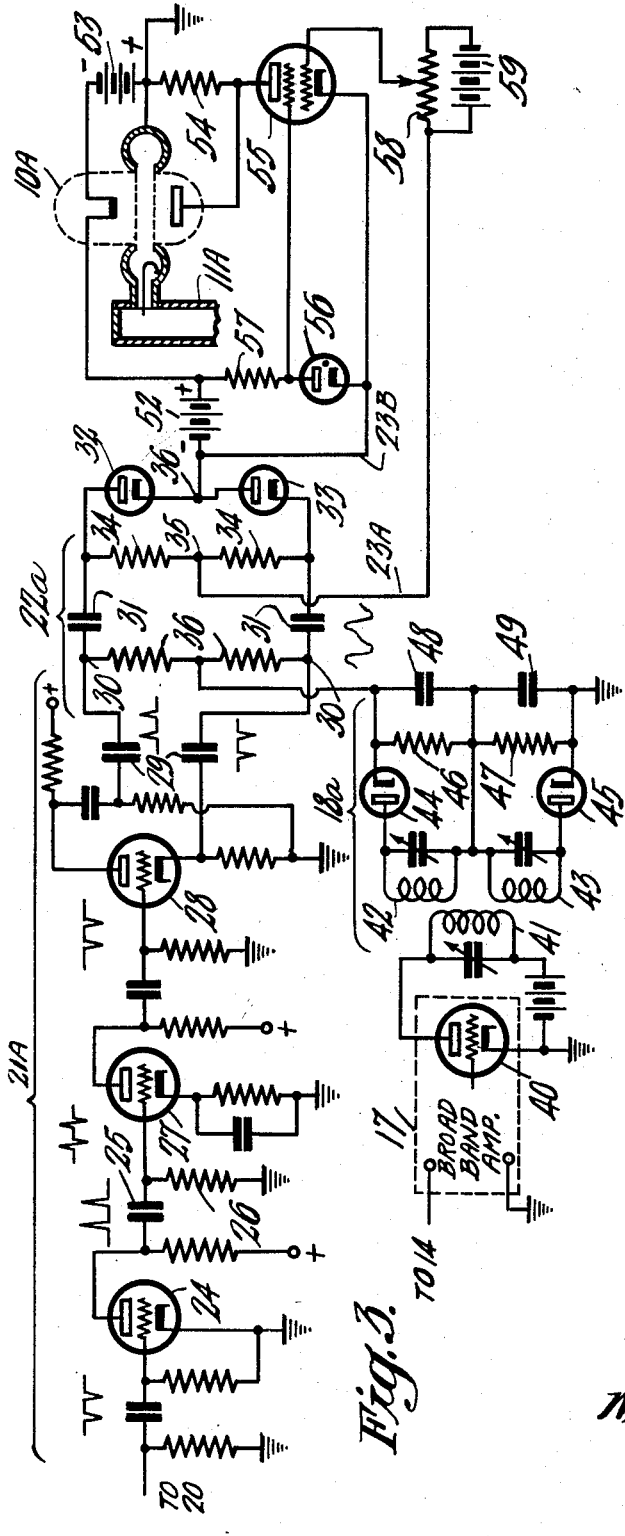
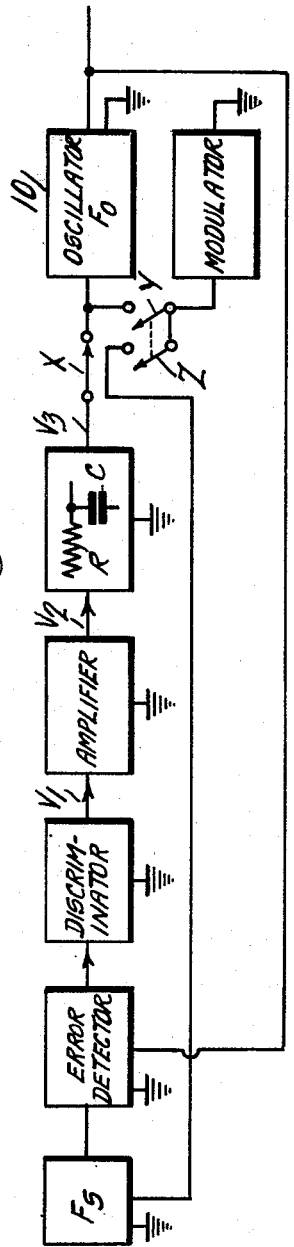
Fig. 3.
Fig. 4.
INVENTOR
William D. Hershberger
BY
ATTORNEY

Patented Dec. 22, 1953

2,663,798

UNITED STATES PATENT OFFICE 2,663,798

METHOD AND SYSTEM FOR STABILIZING THE FREQUENCY OF OSCILLATORS

William D. Hershberger, Princeton, N. J., assignor to Radio Corporation of America, a corporation of Delaware Application December 31, 1948, Serial No. 68,648

9 Claims. (Cl. 250—36)

1

This invention relates to methods and systems for stabilizing the frequency of oscillators, particularly microwave oscillators such as klystrons, magnetrons and the like.

Precise control of the frequency of an oscillator primarily depends upon the obtainment of precise frequency information such as provided at micro-wave frequencies by an absorption line of a molecularly resonant gas, or at lower frequencies by a piezo-electric crystal. However, despite utilization of a highly precise and stable frequency standard, a stabilized oscillator frequency may nevertheless be subject to variation because the "set-point" frequency at which the oscillator is stabilized is subject to variation of operating conditions, such as of supply voltage, of control-system components which transfer or utilize the precise frequency information. Consequently, in systems subject to such variations in set-point frequency, the problem of realizing the available frequency precision of the standard shifts from one of frequency-control to highly precise control of other operating variables such as supply voltages. To isolate the operating variables which affect the set-point frequency of a particular control system and to compensate for their effects to better than one part in a million is a difficult multi-faceted problem and varies for different control systems, even those of the same type.

In accordance with the present invention, dependence of the set-point of a stabilized oscillator upon operating conditions of the stabilizing system is avoided by having the set-point frequency determined by two frequency standards, one of which is the resonant frequency of a sharply resonant circuit element, and the other of which is the null-output frequency of a discriminator.

More particularly, the resonant frequency of one standard is repeatedly swept by the output of a frequency-modulated oscillator to produce sharp pulses conveying precise frequency as a function of time information, and the null-output frequency of the second standard is repeatedly swept by the beat frequency of the two oscillators to produce a wave or pulse abruptly changing in polarity as the null-output frequency is passed. The stabilized oscillator frequency is controlled, preferably automatically, to maintain a fixed phase or time relation between the sharp frequency as a function of time pulses and the zeros of the frequency-error as a function of time wave.

More specifically, when the stabilized oscil-

2 lator is a microwave generator, one of the frequency standards is a cell which contains gas exhibiting molecular resonance within the range of microwave frequencies swept by the sweep generator, and the other frequency standard is a discriminator whose null-output frequency is low compared to the oscillator frequencies.

The invention further resides in methods and systems having the features hereinafter described.

For a more detailed understanding of the invention, reference is made to the accompanying drawings in which:

Figures 2A, 2B and 2C show curves discussed in explanation of Figure 1;

Figure 3 is a schematic diagram of a control system embodying the invention;

Figure 4 is a block diagram discussed in connection with operating factors of Figures 1 and 3; and Figure 5 shows the inter-relation of stability and fidelity factors discussed in connection with preceding figures.

Figure 1:
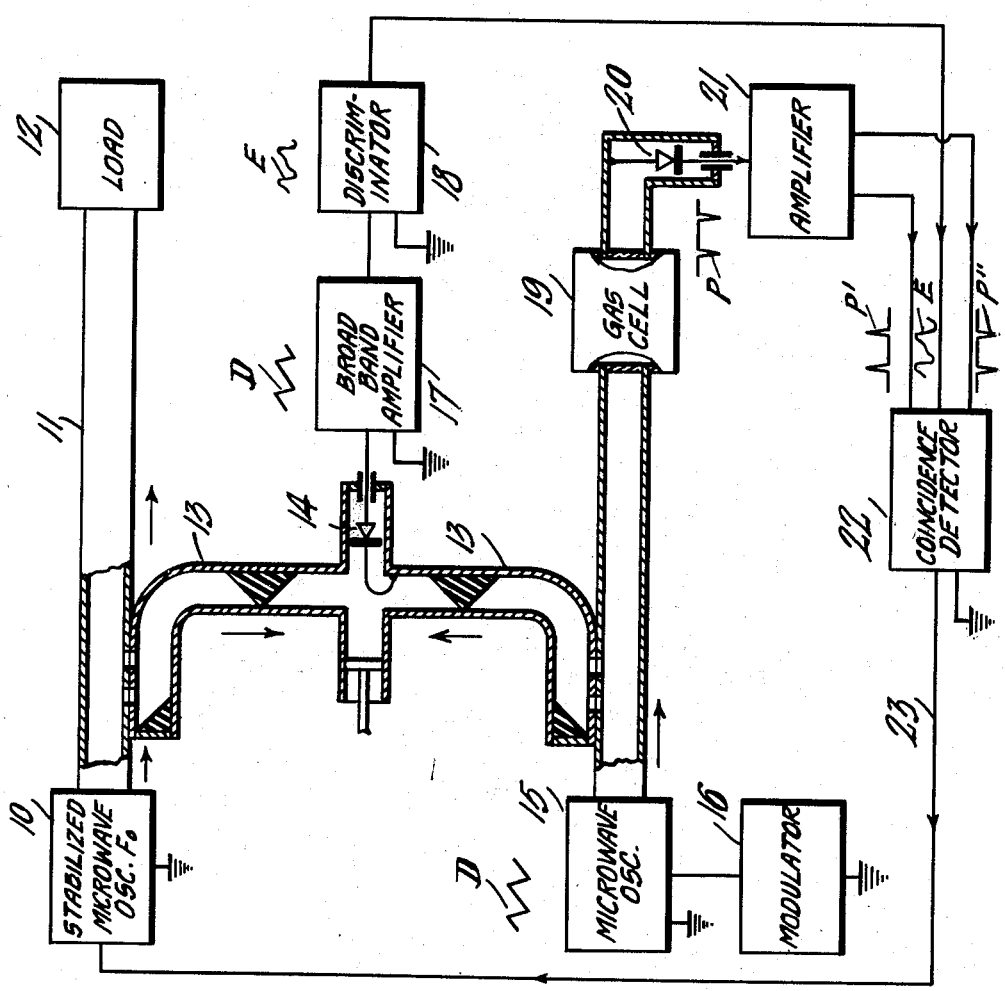
Figure 1 is a block diagram of a stabilized oscillator system.

Referring to Figure 1, the block 10 is generically illustrative of an oscillator whose frequency is to be stabilized. For purposes of explanation, it is assumed the oscillator 10 is a microwave oscillator such as a klystron or magnetron to be used as a signal generator, or in a transmitter of audio or video intelligence. Assuming the latter, the output of the oscillator is impressed upon a transmission line 11, such as a waveguide or concentric line, extending to an antenna, amplifier or other load generically represented by block 12; that portion of the output of oscillator 10 which is to be utilized for stabilization purposes is impressed upon a mixer 14, such as a diode or crystal rectifier, through a circuit including in the particular arrangement of Figure 1 a directional coupler 13.

Upon the mixer 14 is also impressed the output of a second oscillator 15 whose frequency is periodically varied, as by "saw-tooth" modulator 16, repeatedly to sweep over a range of frequencies including the resonant frequency of a standard later identified. In the particular system under discussion, the oscillator 15 may also be a microwave generator such as a klystron or magnetron.

The output of the mixer 14 therefore includes a varying beat-frequency component represented by curve D of Figures 2A-2C continuously equal to the difference between the fixed and varying frequencies of the oscillators 10 and 15 respectively. The width of the frequency band swept by oscillator 15 is large compared to the largest expected frequency deviation of oscillator 10, and the range of frequencies swept by oscillator 15 is to suitable extent either higher or lower than the operating frequencies of oscillator 10. Assuming the former, in each sweep cycle of oscillator 15 the beat-frequency progressively increases from a low value to a higher value, and then returns to the original value as indicated in Figures 2A-2C. The particular beat-frequency curve of each of Figures 2A-2C is based upon the assumption that the sweep range is higher than the frequency of oscillator 10 and that the modulating wave is saw-tooth; obviously, if the sweep range is lower than the oscillator frequency, or if a different form of modulating wave is used, the shape of curve D will correspondingly differ, but may be used if desired, as will be understood by those skilled in the art from the subsequent discussion.

For simplicity of explanation, further discussion is based upon the continued assumption that the beat-frequency varies as indicated in Figures 2A-2C. When the frequency $F_0$ of oscillator 10 is at the normal or desired value, the beat-frequency varies over the range $L_N$ to $H_N$; should the oscillator frequency $F_0$ shift to a lower value, the width of the band swept by the frequency remains the same, but the terminal frequencies of the band are lower by the amount of the frequency-deviation $(-\Delta F_0)$, Figure 2B; on the other hand, if the frequency $F_0$ of oscillator 10 shifts above normal, the terminal frequencies of the beat-output of mixer 14 are respectively higher by an amount corresponding with the deviation $(+\Delta F_0)$, Figure 2C.

The amplifier 17 upon which the output of mixer 14 is impressed is a broad-band amplifier of any suitable type known in the art, designed to pass without distortion a band of frequencies preferably extending from frequency $L_N$ minus the largest expected deviation $\Delta F_0$ to the frequency $H_N$ plus the largest expected deviation $\Delta F_0$.

The output from the amplifier 17 is impressed upon a suitable discriminator, generically represented by block 18, having a frequency/output characteristic exemplified by curve E of Figures 2A-2C. One of various suitable discriminators is shown in Figure 3 and is later herein discussed. As shown in each of Figures 2A-2C, as the impressed beat-frequency varies from one to the other limit of its range in each sweep cycle, the output signal E of the discriminator is a wave or pulse of abruptly changing polarity, the signal increasing in amplitude to a peak of one polarity and then abruptly passing through zero to a maximum of opposite polarity.

The significant point is that although the shape of the output curve E may differ with variation in operating conditions, such as amplitude of the beat-frequency signal, the sweep rate of the oscillator 15, or with supply voltages to the tubes used in any of these circuit components, the change in polarity of the wave or pulse E nevertheless always occurs at the same frequency, $F_D$, Figures 2A-2C.

Resuming description of the operation, every time the difference between the frequencies of oscillators 10 and 15 passes through the null-output frequency $F_D$ of discriminator 18, the output E of the discriminator 18 passes through zero in abruptly changing its polarity. The null-output frequency $F_D$ of the discriminator may, as indicated in Fig. 2A, be chosen to correspond approximately with the midpoint of the normal range $H_N$ to $L_N$ of the varying beat-frequency and accordingly under conditions assumed, the output E of the discriminator will pass through zero at a time T midway of the sweep cycle. However, when the frequency $F_0$ of oscillator 10 is below or above normal, the output E of the discriminator will pass through its zero point $F_D$ later or earlier in the sweep cycle, as graphically indicated in Figures 2B and 2C respectively. Thus, the output E of the discriminator contains precise frequency-error as a function of time information which is not modified or affected by variables unrelated to the frequency-deviations of oscillator 10 and including, for example, change in the repetition rate of oscillator 15, the mixing efficiency of mixer 14, and the gain of amplifier 17.

For automatic stabilization of oscillator 10, the pulsed output of discriminator 18 may be impressed upon one input circuit of a phase-comparator 22 upon whose other input circuit are impressed time-reference pulses P produced each time the frequency of oscillator 15 swings through the molecularly resonant frequency of gas contained within cell 19.

As more fully discussed in earlier copending applications including Serial No. 4497, filed January 27, 1948, the microwave absorption spectra of ammonia, carbon sulphide, methyl halides and other gases having a dipole moment comprise "lines" of distinctly and different frequency-distribution for each gas. At low pressures, in the case of ammonia, for example, each of these "lines" breaks up into a plurality of fine, sharply defined lines, each precisely corresponding with a definite frequency.

The gas line chosen as a precise frequency standard is within the sweep range of oscillator 15 so that for each repetition cycle of sweep oscillator 15, the output of the demodulator 20 which utilizes the microwave energy transmitted through cell 19 is abruptly varied as indicated by curve P of Figures 2A-2C so to produce a sharp pulse. It should be noted that the time of occurrence of this pulse in each cycle of sweep oscillator 15 is rigidly related to time of occurrence a particular sweep frequency and accordingly any variation of the time relation between the occurrence of this pulse and the occurrence of null-output of the beat-frequency discriminator 18 is due solely to a deviation of the frequency of oscillator 10 from normal.

In the generally similar systems shown in my aforesaid copending application Serial No. 4497, sharp pulses were derived from the output of the beat-frequency mixer by a narrow-band amplifier, and these sharp pulses were utilized to trigger a sawtooth oscillator producing a wave similar to that shown by curve S of Figure 2A. With such system it was not found feasible to hold the oscillator frequency constant to one part in ten million because of effect of variation of supply voltage to the sawtooth oscillator upon the shape of curve S which is the charge-discharge curve of a condenser in the saw-tooth oscillator circuit. In such system, the set-point occurs midway, for example, of the discharge portion of curve S and so is offset by an amount $\Delta T$ with respect to the time of the initiating pulse. If the offset were constant, it could be compensated for by adjustment, but actually the offset is dependent upon variables, such as the magnitude of the initiating pulse, the transconductance of the sawtooth tube and the extent and rate of sweep of oscillator 15, which cannot readily be precisely controlled. In consequence, as graphically shown by curves S and $S_1$ of Figure 2A, the variations in set-point frequency due to variations in operating conditions unrelated to frequency-deviation of the stabilized oscillator may substantially exceed small deviations of frequency $F_0$ which the system of Figure 1 can distinguish and compensate for. With the system of Figure 1 in which the set-point frequency is not dependent upon such operating variables, the precision of frequency control is increased by an appreciable factor.

By using an electronic switch, the output pulses E of discriminator 18 and the output pulses P of the demodulator 20 may be alternately impressed upon one input circuit of a cathode ray tube (not shown) upon whose other input circuit is impressed a sweep voltage derived from the modulator 16, in which case the outputs E and P would be presented on the face of the comparator tube substantially as they appear in Figures 2A–2C. An operator could manually adjust a frequency-control of oscillator 10 to maintain the predetermined time relation between the two curves shown in Figure 2A and so maintain the frequency of oscillator 10 at a fixed value. The frequency-control element in case of a klystron tube for example, could be the tuning element of a klystron cavity or the knob of an impedance controlling the operating voltage applied to one of the tube electrodes. Such manual supervision would be most tedious, and it is far more desirable to supply the precise frequency as a function of time information and the precise frequency-error as a function of time information to a suitable phase-comparator generically represented by block 22 whose unidirectional output varies with deviation of the frequency of oscillator 10 and is applied by control line 23 to the oscillator in compensation for such deviation. One suitable known type of phase-comparator is shown in Figure 3 and later herein briefly described.

For automatic control of the frequency of oscillator 10, the broad-band amplifier 17, the discriminator 18, the coincidence detector or phase-comparator 22, and the control line 23 are included in or form a feedback loop between the output and input circuits of the oscillator which loop is supplied with precise frequency as a function of time information derived from the molecularly resonant gas in cell 19. For reasons which will appear in discussion of Figure 4, the stabilized oscillator 10 would strongly resist attempts to modulate its frequency for conveying intelligence at audio and video frequencies, and accordingly when it is desired to frequency-modulate oscillator 10 for such purpose, recourse may be had to the system shown in Figure 4 of my copending application, Serial No. 62,626 filed November 30, 1948, now U. S. Patent 2,591,257.

One particular form of amplifier 21 suitable for amplifying the output of demodulator 20 of Figure 1 is shown within the bracket 21a of Figure 3; specifically, the amplifier tube 24 converts the negative pulses P to positive amplified pulses which are impressed upon a differentiating circuit comprising condenser 25 and resistor 26. The resulting differentiated pulses are in turn impressed upon the grid of a clipper tube 27 to produce sharpened and amplified negative pulses in turn impressed upon inverter tube 28 to provide concurrent pairs of pulses P', P'' of opposite polarity, each pair of which contain the precise frequency as a function of time information of a corresponding pulse P. Further description of amplifier 21A appears unnecessary here as such arrangements are per se known, and in any event are more fully described in my copending application Serial No. 6975, filed February 7, 1948, now U. S. Patent 2,609,654.

The two trains of pulses P', P'' so derived from the anode-cathode circuit of the final tube 28 of amplifier 21A are impressed through condensers 29, 29 upon the input terminals 30, 30 of a phase-comparator 22A which in the particular form shown is similar to that of Figure 7 of my aforesaid copending application Serial No. 6975. The pulses P', P'' are respectively applied to the anode and cathode of oppositely poled diodes 32, 33 or equivalent rectifiers of the phase-comparator. The resistors 34, 34 connected between the anode of rectifier 32 and the cathode of rectifier 33 form a loop for flow of direct current in the circuit including these resistors and the rectifiers. One of the output terminals 35 of the phase-comparator is connected to common lead of resistors 34, 34 and the other output terminal 36 is connected to the lead between the cathode of rectifier 32 and the anode of rectifier 33.

The output of the discriminator is impressed upon the phase-comparator by connection to the common terminal of similar resistors 36, 36 connected in series between the input terminals 30, 30. As the time relation between the pulses P', P'' and the wave E departs from that shown in Figure 2A to that of Figure 2B or Figure 2C, the difference of potential between the output terminals 35, 36 of the phase-comparator increases or decreases depending upon the sense of the frequency-deviation of oscillator 10 and to extent dependent upon the amount of the deviation. This varying direct-current potential may be used to control the frequency of oscillator 10 in any of the various known ways, one of which is later herein described.

As exemplary of a discriminator suited for use as discriminator 18 in the system of Figure 1, there is shown in Figure 3 the so-called "detuned" type of discriminator 18A. In this type of discriminator there is included in the last tube 40 of the broad-band amplifier 17 a tuned circuit 41 resonant at the chosen null-output frequency $F_D$. To this circuit are coupled two tuned circuits 42, 43 respectively resonant at frequencies slightly higher and lower than the null-output frequency of the discriminator, and more sharply tuned than circuit 41. The rectifiers 44 respectively connected to the latter tuned circuits are so poled that the voltages across their load resistors 46, 47 are equal and opposite as the beat-frequency passes through the null-point frequency $F_D$. For beat-frequencies lower than the null-point frequency, the algebraic sum of the voltages across the load resistors 46, 47 is positive, rising to a maximum just before the null-point frequency is reached; for beat frequencies higher than the null-point frequency, the algebraic sum of the voltages across resistors 46, 47 is negative, and the maximum negative value is reached shortly after the null-point frequency is passed. In short, the output/frequency characteristic of the discriminator is that exemplified by curve E of Figures 2A–2C. Any of the other known forms of discriminators having such output characteristic E may be used in substitution for the "detuned" type shown in Figure 3.

When the stabilized oscillator is a klystron tube, its frequency may be controlled by the output of phase-comparator 22A or equivalent by an arrangement such as shown in Figure 3. The output voltage of the phase-comparator is used as a variable bias for the control of a control grid of a control tube 55, the resistance of whose anode-cathode path determines the difference of potential between the anode and the cavity-electrode of the reflex klystron 10A. In the particular arrangement shown, a suitable source of direct-current voltage exemplified by battery 53 is connected between the cathode and cavity of the tube 10A, a resistor 54 is connected between the cavity and the anodes of tubes 10A and 55, and a suitable source of direct-current, exemplified by battery 52, is connected between the cathodes of tubes 10A and 55. The potential of the screen grid of control tube 55 is derived from the source 52 and is stabilized by a regulator tube 56 in series with a resistor 57 across source 52. Accordingly as the bias applied to the control grid of tube 55 is varied to different values, the frequency of the oscillations generated by the klystron shifts to corresponding definite values for reasons well known to those skilled in the art. The biasing potential applied to the control grid of tube 55 comprises, in the arrangement shown in Figure 3, two components, one of which is manually adjustable, and the other of which is automatically varied by the stabilizing system as previously described. The manually adjustable arrangement may include a potentiometer 58 supplied from battery 59 or other suitable direct-current source.

In generally similar manner, the output of phase-comparator 22 or 22A may be used to vary the potential of a frequency-control electrode of other types of tubes; as one example, reference is made to Figure 2 of my copending application Serial No. 786,736, filed November 18, 1947, showing frequency control of a magnetron.

By way of example, when it is desired to stabilize a microwave oscillator for operation at a frequency of 23,900 megacycles, the 3,3 line of ammonia at 23,870 megacycles may be used as one of the frequency standards 19, the microwave oscillator 15 may sweep a band of frequencies of from about 23,898 megacycles to 23,902 megacycles, and the null-output frequency of discriminator 18 may be 30 megacycles. The shape of the modulating wave for oscillator 15 may be a sawtooth or any desired form of wave, and any convenient repetition rate may be employed.

For stabilization of oscillators operating at substantially lower frequencies, a piezo-electric crystal may be used in lieu of gas cell 19, the sweep oscillator 15 may operate over a much lower range of frequencies, and either the sum or difference frequency of the oscillators 10 and 15 may be used in procurement of the timing wave E.

In all cases, the set-point frequency is precisely equal to the algebraic sum of the resonant frequency of a circuit element, such as cell 19 or equivalent, and the null-output frequency of a discriminator having a characteristic exemplified by curve E.

The following discussion of Figure 4 may be helpful in better understanding of the operating performance of the system of Figure 1. There are two distinct characteristics of the stabilizing system which are significant: one if the stabilizing factor which determines how well the disturbances to the frequency of oscillator 10 are minimized; this factor depends upon the discriminator sensitivity, the amplifier gain: the other is the fidelity factor which depends upon the precision with which the set-point or reference frequency defined in the discriminator.

Referring to the block diagram of Figure 4, the frequency $F_0$ to be stabilized is compared with the set-point frequency $F_s$ so that the frequency error may be expressed as $$e = F_s - F_0$$

The output voltage $V_1$ of the discriminator may be expressed as $$V_1 = K_1 e$$

(where $K_1$ is the sensitivity of the error-detector in volts/mc. error).

The corresponding output voltage $V_2$ of the amplifier may accordingly be expressed as $$V_2 = K_2 V_1$$

(where $K_2$ is the amplifier gain).

The resulting output voltage $V_3$ of network R, C, generically representative of the phase-shifting elements of the feedback loop may be expressed as $$V_3 = K_3 V_2$$

(where $$K_3 = \frac{1}{1 + j\omega RC}$$

is the transfer characteristic).

The operating frequency $F_0$ of the oscillator 10 may be expressed as $$F_0 = K_4 V_3$$

(where $K_4$ is the sensitivity of the oscillator in mc./volts).

Consequently, the stabilized operating frequency $$F_0 = \frac{K_1 K_2 K_4}{1 + j\omega CR} e$$

$$= \mu(F_s - F_0)$$

(where $$\mu = \frac{K_1 K_2 K_4}{1 + j\omega CR}$$

the overall gain)

$$= \frac{\mu}{\mu + 1} F_s$$

Now assuming a small change $\Delta F_s$ in set-point frequency, the corresponding change $\Delta F_0$ in the oscillator frequency may be expressed as (1)

$$\Delta F_0 = \frac{\mu}{\mu + 1} \Delta F_s$$

Now considering the effect of applying a modulating signal to oscillator 10 (switch Y closed) to effect a change $dF_0$ in its frequency: with the feedback loop open (switch X open), there would be a voltage change $dV_3$ (of voltage $V_3$) equal to $$\frac{\mu}{K_4} dF_0$$

With the feedback loop closed, however (switch X closed), the change in $V_3$ is not $dV_3$ but a smaller residual value $dV_3^1$ which may be expressed as $$d V_3^1 = dV_3 - \mu dV_3^1$$

or $$dV_3^1 = \frac{1}{1 + \mu} dV_3$$

The relation between the corresponding changes in oscillator frequency with the feedback loop open and closed respectively may be expressed as (2)
$$dF_0^1 = \frac{1}{1+\mu}dF_0$$

With the feedback loop closed and modulation applied both to change the oscillator frequency and the set-point frequency (all of switches X, Y, Z closed), the resulting change in oscillator frequency may be expressed as (3)
$$\Delta F_0 + dF_0^1 = \frac{\mu}{\mu+1}\Delta F_s + \frac{1}{1+\mu}dF_0$$

As above noted, if with the feedback loop open, a frequency change $dF_0$ is injected into the oscillator, by varying an appropriate electrode voltage or by changing the cavity size in the case of a klystron, an "error-voltage" $dV_3$ appears but, however, with the feedback loop closed, the "error-voltage" is reduced to $dV_3^1$, the relation being $$\frac{dV_3^1}{dV_3} = \frac{1}{1+\mu}$$

or $$\frac{1}{1+\mu} = \frac{1}{S}$$

(S is the stability factor) Figure 5.

With the arrangement shown in my copending application, Serial No. 4497, using a gain ($\mu$) of $10^5$, a 10 megacycle disturbance is reduced to a 100 cycle observed frequency change. However, with that arrangement for reasons above discussed, the set-point frequency $F_s$ may vary with operating conditions and in such case the situation is quite different because $$\Delta F_0 = \frac{\mu}{\mu+1}\Delta F_s$$

The change in frequency due to modulation is effectively removed by the stabilizing factor ($S=\mu+1$) but the change in set-point frequency is reproduced in the output frequency in accordance with the fidelity factor $$\left(G = \frac{\mu}{\mu+1}\right)$$

In short, errors or ambiguities in the set-point frequency are not removed by the feedback loop. However, with the system previously herein described which uses the null-output frequency of the discriminator as a frequency-standard, the ambiguity or uncertainty in the set-point frequency is eliminated.

When it is desired to frequency-modulate the oscillator 10 by audio or video signals, the modulation may not be applied only to the oscillator because it would be effectively wiped out by the stabilizing factor of the feedback loop, but it must be also applied to the set-point frequency to appear as a change in oscillator frequency in accordance with the fidelity factor of the feedback loop. In such case, there is imposed the condition of tracking i. e., that the change in set-point frequency due to modulation is made equal to the change in frequency produceable with the feedback circuit open ($\Delta F_s = dF_0$) so that Equation 3 becomes (4)      $\Delta F_0 + dF_0^1 = \Delta F_s = \Delta F_0$ In short, with tracking accomplished in the system of Figure 1 hereof, as by the arrangement shown in Figure 4 of my copending application Serial No. 62,626 filed November 30, 1948, the percentage modulation is the same as though the oscillator were not rigidly subject to precise control of its carrier frequency by the two frequency standards, the gas-line frequency and the null-output frequency of the discriminator.

What is claimed is:

1. For use in a system for stabilizing the frequency of an oscillator, a circuit comprising means for producing a frequency-stabilizing voltage including a comparator having two input circuits; means including a generator having a variable frequency output swept repetitively over a range of frequencies and a sharply resonant circuit element to which said variable frequency output is applied and resonant at a predetermined frequency within said range for applying sharp voltage pulses to one of said input circuits; and means, including a mixer for the outputs of said generator and said oscillator and a discriminator connected to receive the mixer output and having a sharp null-output frequency, for applying a voltage of varying polarity to the other of said input circuits to provide a precise frequency control voltage as the comparator output.

2. For use in a system for stabilizing the frequency of a microwave oscillator, a circuit comprising means for producing a frequency-control voltage including a comparator having two input circuits; means for applying to one of said circuits an input signal and including a generator having a variable frequency output swept repetitively over a range of frequencies and a cell containing gas exhibiting molecular resonance at a frequency within the sweep range of said generator to which gas said variable frequency output is applied; and means for applying to the other of said circuits a second input signal and including means for producing a beat-frequency varying as the algebraic sum of the oscillator and sweep-generator frequencies and a discriminator connected to receive said sum frequencies and having a sharply defined null output at a frequency within the range of variation of said beat-frequency, whereby the comparator output is a precise frequency control voltage.

3. For use in a system for stabilizing the frequency of an oscillator, a circuit comprising means for producing a frequency-control voltage including a comparator having two input circuits; means for applying to one of said circuits an input signal including a generator having a variable frequency output swept repetitively over a range of frequencies and a frequency standard sharply resonant at a frequency within the sweep range of said generator connected to receive said variable frequency output; and means for applying to the other of said input circuits an input signal and including means for producing a beat-frequency signal corresponding to the algebraic sum of the frequencies of said oscillator and said sweep-generator, a broadband amplifier for said varying beat-frequency signal, and a discriminator for the amplified beat-frequency signal having a sharply defined null output at a frequency within the broad-band of said amplifier, whereby the comparator output voltage is a precise frequency control voltage.

4. For use in a system for stabilizing the frequency of a microwave oscillator, a circuit comprising means for producing a frequency-control voltage including a time-comparator having two input circuits; means for applying to one of said circuits an input signal including a microwave oscillator having a variable frequency output swept repetitively over a range of frequencies and a cell containing gas exhibiting molecular resonance at a frequency within the sweep range; and means for applying to the other of said circuits an input signal including a mixer producing a signal varying with the difference-frequency of said oscillators, a broad-band amplifier for said difference-frequency signal, and a discriminator for the amplified difference-frequency signal having null output at a sharply defined frequency within the broad-band of said amplifier and within the difference frequency signal frequency range, whereby the comparator output voltage is responsive to said microwave oscillator frequency.

5. For use in a system for stabilizing the frequency of an oscillator, a circuit comprising two standards of frequency jointly determining the reference or set-point frequency of the stabilizing system, one of said standards consisting of a circuit element having a sharply defined resonant frequency of the same order as the oscillator frequency, and the other of said standards consisting of a discriminator having a sharply defined null-output frequency of an order substantially lower than the oscillator frequency, means for providing precise frequency control of said oscillator including a generator having a variable frequency output swept repetitively over a range of frequencies and said circuit element connected to receive said variable frequency output to produce recurrent signal pulses, a mixer connected to receive and mix the outputs of said generator and said oscillator and apply the mixed signal to said discriminator thereby to produce a continuous signal whose polarity abruptly changes as the difference-frequency of said oscillator and said sweep-generator passes through said null-output frequency, and comparator means upon which said pulsed and continuous signals are impressed to produce a frequency-control voltage varying in sense and magnitude with the sense and extent of deviations of the oscillator frequency from said set-point frequency.

6. For use in a system for stabilizing the frequency of a microwave oscillator, a circuit comprising a cell containing gas exhibiting molecular resonance at a microwave frequency, sweep frequency means for repeatedly impressing upon said gas energy having a range of frequencies including said molecular resonance frequency, means for demodulating the output of said gas cell to produce a series of sharp pulses each occurring as the sweep frequency of said energy passes through said molecularly resonant frequency of the gas, a mixer upon which is impressed the outputs of said oscillator and said sweep frequency means to produce a varying beat-frequency, a discriminator for the output of said mixer having null output at a frequency within the range of variation of said beat-frequency to produce a varying voltage abruptly passing through zero value and changing polarity as said beat-frequency passes through said null-output frequency, and a phase comparator upon which said pulses and said varying voltage are impressed for correcting the frequency of said oscillator upon deviation from coincidence of said pulses with the zero values of said varying voltage.

7. For use in a system for stabilizing the frequency of a microwave oscillator, a circuit comprising a cell containing gas exhibiting sharp molecular resonance at a microwave frequency, sweep frequency means for repeatedly impressing upon said gas energy having a range of frequencies including said molecular resonance frequency, means for demodulating the output of said gas cell to produce a series of sharp pulses, a mixer upon which is impressed the outputs of said oscillator and said sweep frequency means, a broad-band amplifier for amplifying the varying beat-frequency output of said mixer, a discriminator supplied with the amplified beat-frequency and having null output at a fixed frequency within the range of variation of the beat-frequency, and a phase-comparator upon which said pulses and the output of said discriminator are impressed to provide a frequency-control voltage varying in accordance with deviations of the oscillator frequency from the desired frequency.

8. A system for stabilizing the frequency of an oscillator comprising a feedback loop including a mixer, a broad-band amplifier and a discriminator effectively in series between the radio-frequency output and direct-current input systems of said oscillator, means for supplying said loop with precise frequency-error as a function of time information comprising a sweep oscillator connected to said mixer to provide a difference-frequency input for said broad-band amplifier, and means for supplying said loop with precise frequency as a function of time information comprising said sweep oscillator and a resonant circuit element swept by the varying sweep-oscillator frequency, said loop also including means for supplying said direct-current input system with a frequency-control voltage varying in accordance with the phase relation between the discriminator output and the output of said resonant circuit element.

9. A system comprising a resonant circuit element having a predetermined resonant frequency, a first oscillator having a first operating frequency responsive to a control signal, a second oscillator having a second operating frequency responsive to a control signal and connected to apply a portion of its output to said resonant circuit, a modulating signal generator connected to said second oscillator to modulate the frequency thereof at a repetition frequency over a range including said resonant frequency, a mixer connected to said oscillators to receive energy of said operating frequencies and having as an output a signal of the variable difference frequency therebetween, a discriminator tuned to provide zero voltage output at a definite frequency connected to receive said variable difference frequency signal, and a phase comparator connected to receive said discriminator output and connected to receive the output from said resonant circuit and connected to apply its output voltage to said first oscillator for frequency control thereof.

WILLIAM D. HERSHBERGER.

References Cited in the file of this patent

UNITED STATES PATENTS

| Number | Name | Date |
|---|---|---|
| 2,429,636 | McCoy | Oct. 28, 1947 |
| 2,462,294 | Thompson | Feb. 22, 1949 |